March 14, 1933.  M. O. SLEEPER  1,901,780
WEATHER STRIP
Filed Oct. 12, 1931
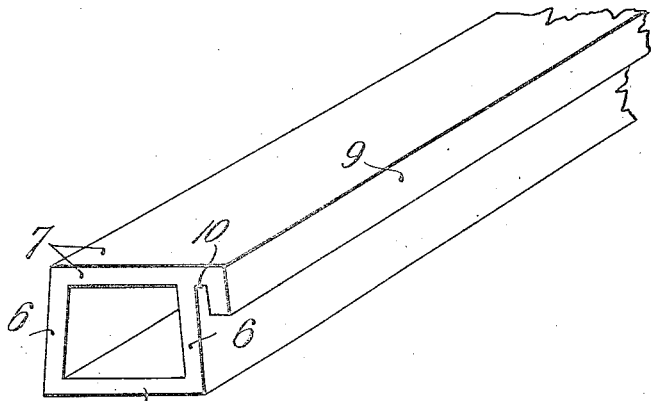
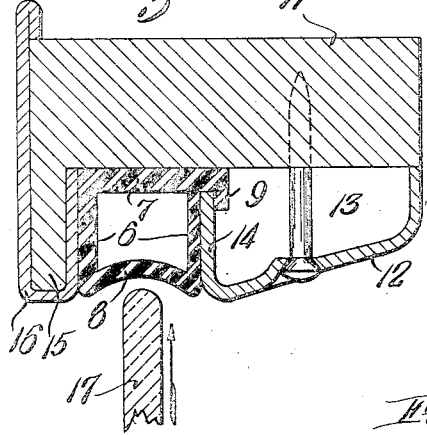
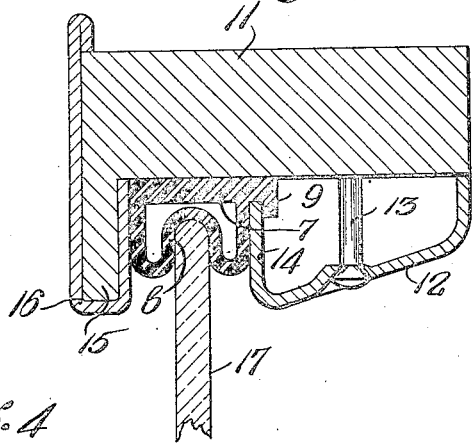
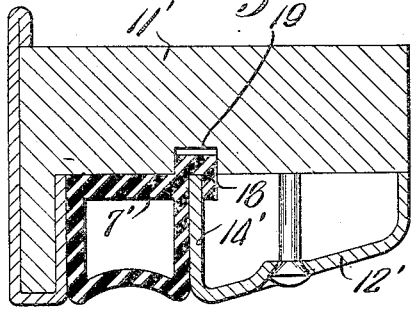
Inventor
Myron O. Sleeper
By Henry C. Thomsen
his Attorney ated Mar. 14, 1933

1,901,780

UNITED STATES PATENT OFFICE

MYRON O. SLEEPER, OF HANSON, MASSACHUSETTS, ASSIGNOR TO GEORGE A. CLAPP, OF BROOKLINE, MASSACHUSETTS, AND CARL F. WOODS, OF WINCHESTER, MASSACHUSETTS, RECEIVERS OF E. H. CLAPP RUBBER COMPANY, OF BOSTON, MASSACHUSETTS, A CORPORATION OF MASSACHUSETTS

WEATHER STRIP

Application filed October 12, 1931. Serial No. 568,405.

This invention relates to improvements in cushioning weather strips particularly adapted for use as a resilient seat for the upper edge of the window of an automobile. The principal object of the invention is to provide a simple, economical, durable and efficient cushion strip and strip mounting which may be easily and quickly assembled at the top of the window without the use of tacks, nails or other special fastenings passing through the cushion and which tightly seals the closed window against the admission of rain, wind or dust.

The special features of the improved cushion strip are hereinafter described in connection with the accompanying drawing illustrating a recommended embodiment of the invention, and will be pointed out in the appended claim, it being understood that the structural details of the apparatus may be varied to suit particular purposes without departing from the essence of this invention as defined in said claim. In the drawing, Fig. 1 is a perspective view of the improved strip;

Fig. 2 is a sectional view of a window frame equipped with the cushion strip and its attachments;

Fig. 3 is a similar view showing the top of the window closed against the cushion strip; and Fig. 4 is a view like that of Fig. 2 showing a modification.

The improved cushion and weather strip preferably consists of a piece of rubber tubing generally rectangular in cross section but having side walls 6 diverging outwardly from its base or rear wall 7 toward its front face 8. The base of this hollow strip is provided with an integral side flange 9 providing a longitudinal channel 10 between the flange and one of the sides 6.

The base 7 of the strip is applied against the under side of the upper window frame 11 as shown in Fig. 2 and a retaining plate 12 is fastened to the frame as by screws 13 with one inwardly bent side 14 engaging in the channel behind the flange 9 and against one side 6 of the rubber strip. The opposite side of the strip bears against a downward projection 15 of the frame, which may be sheathed by a metal facing 16; and the rubber tube is transversely compressed between the abutment 15 and the flange 14 of the garnishing plate or molding 12 so that its sides 6 are substantially parallel. Hence the front 8 of the cushion is cupped or concaved (Fig. 2) by the lateral constriction of the relatively wide front wall, thereby providing a longitudinal depression for receiving the edge of the upwardly moving window pane 17.

As the pane 17 is elevated into engagement with the cushion, the cupped front wall 8 is depressed toward the back 7 and between the sides 6 of the cushion strip and the sides of the pane. An unusually tight seal is thus afforded, and it is apparent that the pane is safely and securely held in position, thus preventing damage to the window and avoiding any tendency of the pane to rattle or shake. This feature is particularly important in the windows of automobile doors which are subjected to considerable vibration during driving and to abrupt jars when the door is opened or closed. Obviously the yielding nature of the compressible cushion obviates shock to the pane and at the same time prevents excessive lateral displacement of the window.

In the modified form illustrated in Fig. 4, the side flange 18 of the cushion base 7' projects rearwardly as well as laterally of the rubber strip, and the rearward projection is fitted within a longitudinal recess 19 of the frame 11'. In this case, the molding flange 14' forces the rubber flange 18 into the frame recess, thereby providing a more secure anchorage which eliminates any likelihood that the cushion may be dislodged from the frame or displaced from proper position until the anchoring plate 12' is removed.

From the foregoing it is apparent that the hollow cushion strip is inexpensive to manufacture and easy to install or remove; the absence of tacks or other fastenings passing through the rubber avoids damage to the strip or impairment of its cushioning qualities; the yielding front wall resiliently embraces the edge of the window pane and protects the glass from damage as well as providing a tight seal between pane and window frame; and the cushion is fixedly secured by the anchoring plate so that it will not be accidentally dislodged from operative position.

I claim:

In combination with a window frame member having a longitudinal, inwardly projecting abutment, a cushioning weather strip for the top of a sliding window pane, comprising a tubular, four-sided cushion strip of resilient material having its rear wall engaging the under surface of the frame and one side wall engaging said abutment, the rear wall having an integral, laterally projecting flange providing a longitudinal channel, and a molding strip fastened to the under surface of the frame and having a rearwardly directed flange extending along the opposite side wall of the cushion strip and having its free edge engaging in said channel to clamp the cushion strip against the frame, the bottom of the frame having a recess extending longitudinally of the cushion strip and the flange of said strip having a rearwardly projecting portion received in said recess thereby to prevent lateral displacement of the strip.

In testimony whereof I affix my signature.

MYRON O. SLEEPER.